US012654200B2

(12) United States Patent
Hozumi

(10) Patent No.: US 12,654,200 B2
(45) Date of Patent: Jun. 16, 2026

(54) COATING FILM, AUTOMOBILE, AND COATING METHOD

(71) Applicant: KYOCERA CORPORATION, Kyoto (JP)

(72) Inventor: Daisuke Hozumi, Kirishima (JP)

(73) Assignee: KYOCERA CORPORATION, Kyoto (JP)

( * ) Notice: Subject to any disclaimer, the term of this patent is extended or adjusted under 35 U.S.C. 154(b) by 133 days.

(21) Appl. No.: 17/755,316

(22) PCT Filed: Jun. 30, 2020

(86) PCT No.: PCT/JP2020/025700
§ 371 (c)(1),
(2) Date: Apr. 26, 2022

(87) PCT Pub. No.: WO2021/084796
PCT Pub. Date: May 6, 2021

(65) Prior Publication Data
US 2022/0395859 A1 Dec. 15, 2022

(30) Foreign Application Priority Data
Oct. 29, 2019 (JP) ................................ 2019-196748

(51) Int. Cl.
| | |
|---|---|
| *B62D 35/00* | (2006.01) |
| *B05D 1/26* | (2006.01) |
| *B05D 5/02* | (2006.01) |
| *B05D 5/06* | (2006.01) |
| *B05D 7/00* | (2006.01) |
| *C09D 5/00* | (2006.01) |

(52) U.S. Cl.
CPC ................. *B05D 5/02* (2013.01); *B05D 1/26* (2013.01); *B05D 5/06* (2013.01); *B05D 7/54* (2013.01); *B62D 35/00* (2013.01); *C09D 5/00* (2013.01)

(58) Field of Classification Search
CPC ...... Y10T 428/24479; Y10T 428/2457; B05D 1/02; B05D 7/14; B05D 7/142; B05D 7/144; B05D 7/52; B05D 1/26; B05D 5/02; B05D 5/002; B05D 5/06; B05D 7/54; C09D 5/00; B62D 37/02; B62D 35/00; Y02T 10/82; B63B 1/36; B63B 1/34; F15D 1/003; F15D 1/0035; F15D 1/004; F15D 1/0045; B64C 23/06; B64C 21/10; B64C 2230/26
USPC .................................... 428/156, 167, 31, 141
See application file for complete search history.

(56) References Cited

U.S. PATENT DOCUMENTS

| | | | | |
|---|---|---|---|---|
| 4,706,910 | A | * 11/1987 | Walsh | ..................... B64C 21/10 296/180.1 |
| 5,069,403 | A | 12/1991 | Marentic et al. | |
| 5,133,516 | A | 7/1992 | Marentic et al. | |
| 6,276,636 | B1 | 8/2001 | Krastel | |

(Continued)

FOREIGN PATENT DOCUMENTS

| | | |
|---|---|---|
| CN | 207906117 U | 9/2018 |
| CN | 109774803 A | 5/2019 |

(Continued)

*Primary Examiner* — Catherine A. Simone
(74) *Attorney, Agent, or Firm* — HAUPTMAN HAM, LLP

(57) ABSTRACT

A coating film is provided on the surface of a car body of an automobile and includes a plurality of protruding portions extending from the front toward the rear along the car body.

2 Claims, 16 Drawing Sheets

(56)         References Cited

U.S. PATENT DOCUMENTS

| | | | |
|---|---|---|---|
| 6,412,853 B1 | 7/2002 | Richardson | |
| 2001/0038910 A1 | 11/2001 | Macqueen et al. | |
| 2004/0155150 A1 | 8/2004 | Krohmer et al. | |
| 2005/0163963 A1 | 7/2005 | Munro et al. | |
| 2011/0177303 A1 | 7/2011 | Suehiro et al. | |
| 2011/0287220 A1 | 11/2011 | Ban et al. | |
| 2015/0251711 A1 | 9/2015 | Carlson | |
| 2016/0271930 A1 | 9/2016 | Roper et al. | |
| 2017/0144255 A1* | 5/2017 | Song | .................... B23K 26/364 |
| 2022/0347716 A1 | 11/2022 | Hozumi | |

FOREIGN PATENT DOCUMENTS

| | | | | |
|---|---|---|---|---|
| CN | 109890516 A | 6/2019 | | |
| EP | 2474372 A2 * | 7/2012 | .......... | B08B 17/065 |
| JP | S6164368 A | 4/1986 | | |
| JP | 2001050215 A | 2/2001 | | |
| JP | 2004345562 A | 12/2004 | | |
| JP | 2005522644 A | 7/2005 | | |
| JP | 2008253974 A | 10/2008 | | |
| JP | 2010125886 A | 6/2010 | | |
| JP | 201643736 A | 4/2016 | | |
| JP | 201693774 A | 5/2016 | | |
| JP | 2019123406 A | 7/2019 | | |
| WO | 8911343 A2 | 11/1989 | | |

* cited by examiner

COATING FILM, AUTOMOBILE, AND COATING METHOD

CROSS-REFERENCE TO RELATED APPLICATIONS

This application is national stage application of International Application No. PCT/JP2020/025700, filed on Jun. 30, 2020, and which claims the benefit of priority from Japanese Patent Application No. 2019-196748, filed on Oct. 29, 2019.

TECHNICAL FIELD

Disclosed embodiments relate to a coating film, an automobile, and a coating method.

BACKGROUND ART

For example, there has been proposed a coating method in which unevenness is provided on the surface of an object to be coated such as an automobile to enhance heat radiation.

CITATION LIST

Patent Literature

Patent Document 1: JP 2016-93774 A
Patent Document 2: JP 2008-253974 A

SUMMARY OF INVENTION

A coating film according to one aspect of the embodiments is located on the surface of a car body of an automobile and includes a plurality of protruding portions extending from the front toward the rear along the car body.

DESCRIPTION OF EMBODIMENTS

Figure 1:
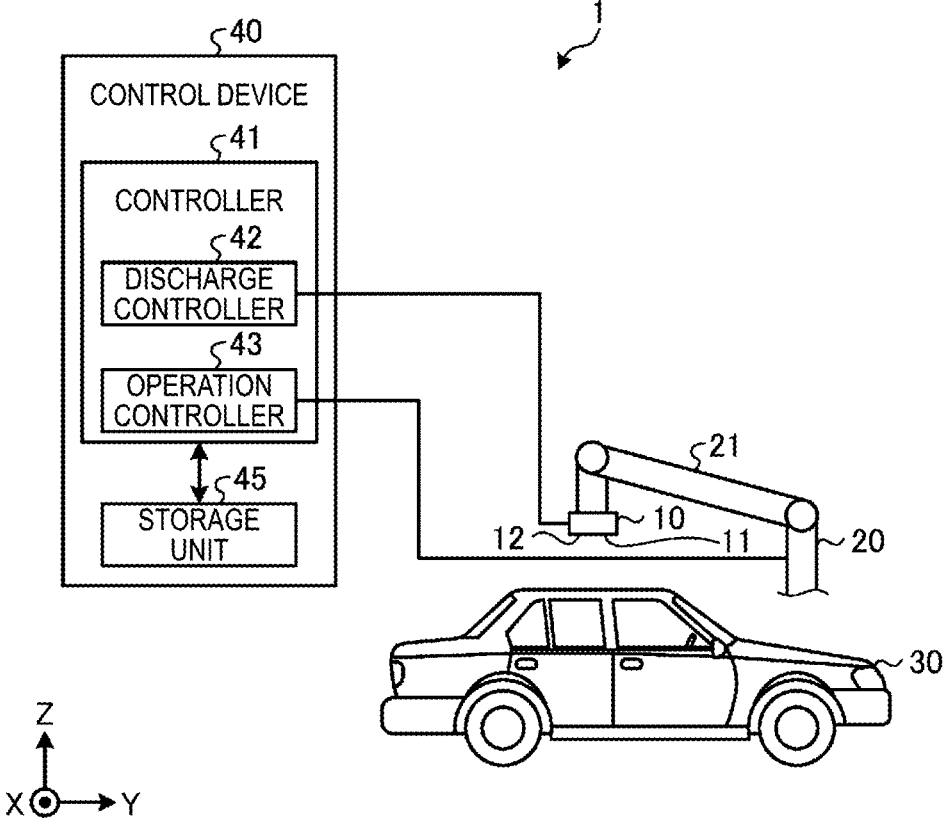
FIG. 1 is an explanatory diagram illustrating an example of a coating device.

Hereinafter, embodiments of a coating film, an automobile, and a coating method disclosed in the present application will be described in detail with reference to the accompanying drawings. The present invention is not limited by the following embodiments.
Configuration of Coating Device
First, an overview of a coating device used for coating a car body will be described with reference to FIG. 1. FIG. 1 is an explanatory diagram illustrating an example of a coating device. For the sake of clarity, FIG. 1 illustrates a three-dimensional orthogonal coordinate system including a Z-axis in which the vertically upward direction is a positive direction and the vertically downward direction is a negative direction. Such orthogonal coordinate systems may also be presented in other drawings used in the description below. The same components as those of a coating device 1 illustrated in FIG. 1 are denoted by the same reference numerals, and descriptions thereof will be omitted or simplified.
As illustrated in FIG. 1, the coating device 1 includes a head 10, a robot 20, and a control device 40.
The head 10 is fixed to the robot 20. The head 10 moves according to the operation of the robot 20 controlled by the control device 40.
The head 10 coats a car body 30 by depositing a coating material discharged from a plurality of discharge holes 11 located on a nozzle surface 12 onto a surface of the car body 30 to be coated, facing the nozzle surface 12.
The head 10 is supplied with a coating material from a tank (not illustrated). The head 10 discharges the coating material supplied from the tank. The coating material is a mixture including a volatile component and a nonvolatile component, and has fluidity. The tank may be a reservoir (not illustrated) contained in the head 10.
The volatile component is, for example, water, organic solvent, or alcohol and adjusts the physical properties of the coating materials, such as viscosity and surface tension. The nonvolatile component includes, for example, a pigment, a resin material, and an additive. The pigment includes one or a plurality of colored pigments used depending on the desired coating color. The resin material adheres to the car body 30 to be coated to form a film. The additive is a functional material that is added, for example for purposes of weather resistance.
Note that the coating material supplied to the discharge holes 11 is prepared such that a desired coating color is expressed by mixing a plurality of colored pigments or coating materials at predetermined proportions.
The robot 20 holds the head 10. The robot 20 is, for example, a six-axis articulated robot. The robot 20 may be, for example, a vertical articulated robot or a horizontal articulated robot. The robot 20 includes a plurality of arms 21 each of which has the head 10 fixed to a tip of the arm 21. The robot 20 is fixed to, for example, a floor, a wall, or a ceiling. Note that as long as the held head 10 can be moved properly, there is no limit to the degree of freedom of the arms 21 included in the robot 20.

The control device 40 controls the coating device 1. The control device 40 includes a controller 41 that controls the coating device 1, and a storage unit 45. The controller 41 includes a discharge controller 42 and an operation controller 43.

The controller 41 includes a computer or various circuits including, for example, a central processing unit (CPU), a read only memory (ROM), a random access memory (RAM), a hard disk drive (HDD), and an input/output port. The CPU of such a computer functions as the controller 41 by, for example, reading and executing a program stored in the ROM. The controller 41 may also include hardware such as an application specific integrated circuit (ASIC) or a field programmable gate array (FPGA). The discharge controller 42 controls the head 10 based on the configuration information stored in the storage unit 45, and discharges the coating material from the plurality of discharge holes 11 toward the car body 30. The operation controller 43 controls operations of the plurality of arms 21 based on the configuration information stored in the storage unit 45, and controls movement of the head 10 via the arms 21. The distance between the head 10 and the car body 30 is maintained at, for example, approximately from 0.5 to 14 mm.

The storage unit 45 corresponds to, for example, the ROM and the HDD. The ROM and the HDD can store the configuration information for various controls in the control device 40. The storage unit 45 stores information related to discharge control of the coating material by the head 10. Further, the storage unit 45 stores information related to the operation control of the plurality of arms 21. The storage unit 45 may store data input by the user's instruction operation using a terminal apparatus (not illustrated) as instruction data for operating the robot 20. Further, the controller 41 may also obtain the configuration information via another computer or portable storage medium connected by a wired or wireless network.

The car body 30 is a car body of an automobile. The car body 30 is placed on a conveying device (not illustrated), and is carried in and out. The coating device 1 according to an embodiment coats the car body 30 in a state where the conveying device is stopped. The coating device 1 may coat the car body 30 while the car body 30 is being repeatedly conveyed and stopped, or may coat the car body 30 simultaneously while the car body 30 is being conveyed.

Figure 2:
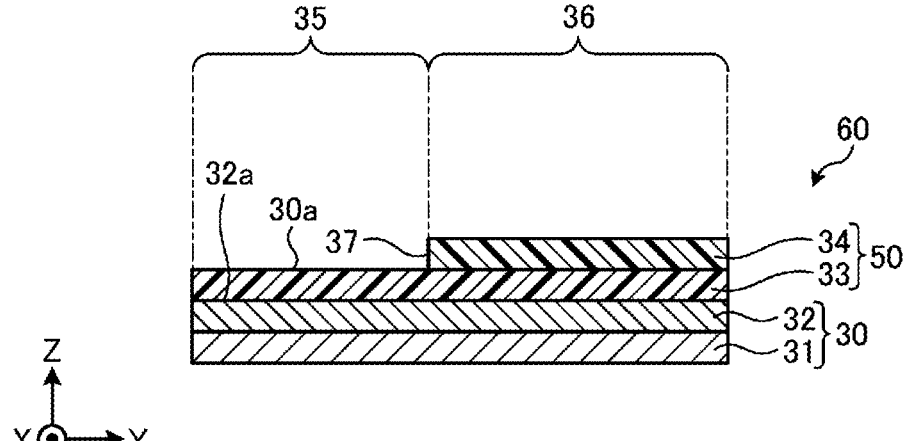
FIG. 2 is a cross-sectional view illustrating an example of an automobile according to an embodiment.

FIG. 2 is a cross-sectional view illustrating an example of an automobile according to an embodiment. An automobile 60 illustrated in FIG. 2 includes a base member 31, a primer layer 32, a first coating layer 33, and a second coating layer 34. Here, the automobile 60 includes one or a plurality of power sources, such as an engine or a motor, and refers to a vehicle running on a road with three or more wheels without using rails or overhead lines. The automobile 60 may be, for example, a private vehicle or a commercial vehicle, and there is no limitation on the use of the automobile 60.

The base member 31 is, for example, a steel plate processed into a predetermined shape, and is subjected to an electrodeposition process as necessary to impart rust resistance. The primer layer 32 is provided for imparting weather resistance, color development, and peeling resistance, for example. The first coating layer 33 is, for example, a base layer that has smoothness and weather resistance and imparts a desired coating color. A surface of the first coating layer 33 serves as a to-be-coated surface 30a to be coated by the coating device 1 according to the embodiment.

A second coating layer 34 is located on the first coating layer 33 serving as the to-be-coated surface 30a. The second coating layer 34 is located in a manner to cover a portion of the first coating layer 33, for example, with a coating material having a coating color different from that of the first coating layer 33. As a result, the car body 30 becomes a coated automobile 60 that is coated in a so-called two tone color in which a region 36 where the second coating layer 34 is located and a region 35 where the first coating layer 33 is exposed without the second coating layer 34 being located are aligned with an end portion 37 of the second coating layer 34 as a boundary.

In the example illustrated in FIG. 2, the coating device 1 arranges the second coating layer 34 on the to-be-coated surface 30a on the first coating layer 33, but the embodiments are not limited to the example, and the coating device 1 may be used, for example, to arrange the first coating layer 33 on a coated surface 32a of the primer layer 32.

Note that the automobile 60 is not limited to the example illustrated in FIG. 2. For example, a coating layer (not illustrated) may be located on the surface of the region 35 or 36. Further, the second coating layer 34 may not be provided, and only the first coating layer 33 may be provided, or the second coating layer 34 may be located on the entire surface of the first coating layer 33. Further, the car body 30 or the automobile 60 may further include one or a plurality of layers (not illustrated). In the following description, the first coating layer 33 and the second coating layer 34 are collectively referred to as a coating film 50 without distinction, and the base member 31 and the primer layer 32 are collectively referred to as the car body 30 without distinction.

First Embodiment

Figure 3:
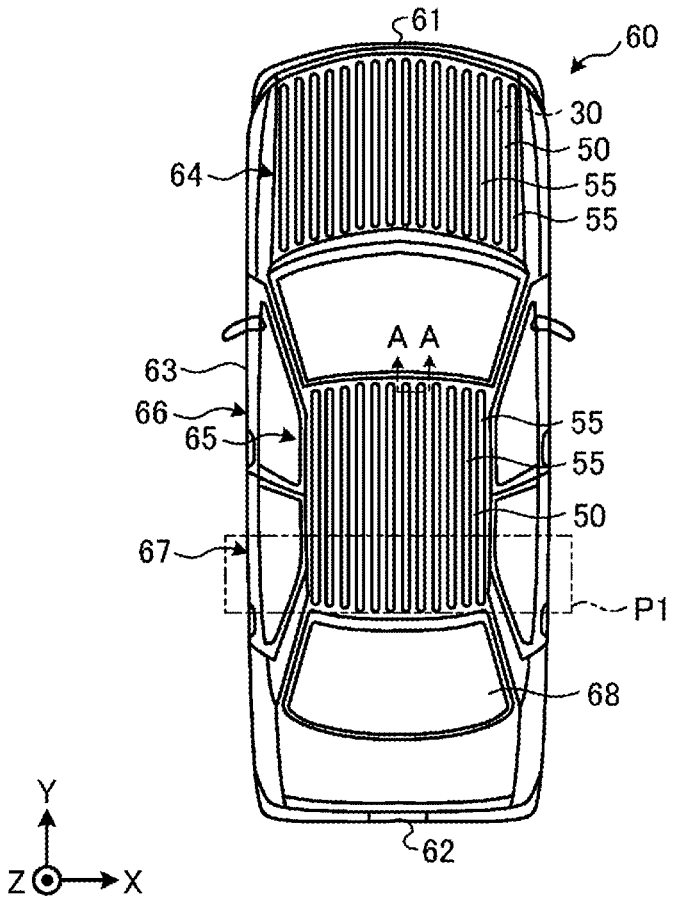
FIG. 3 is a plan view illustrating an example of an automobile according to a first embodiment.
Figure 4:
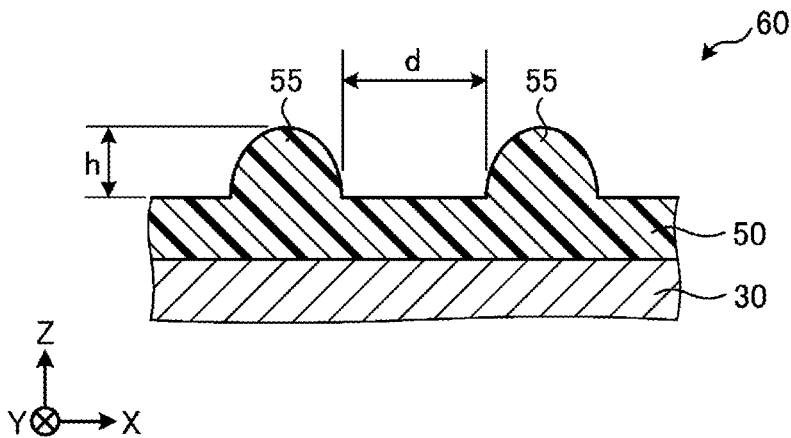
FIG. 4 is a cross-sectional view taken along line A-A in FIG. 3.
Figure 5:
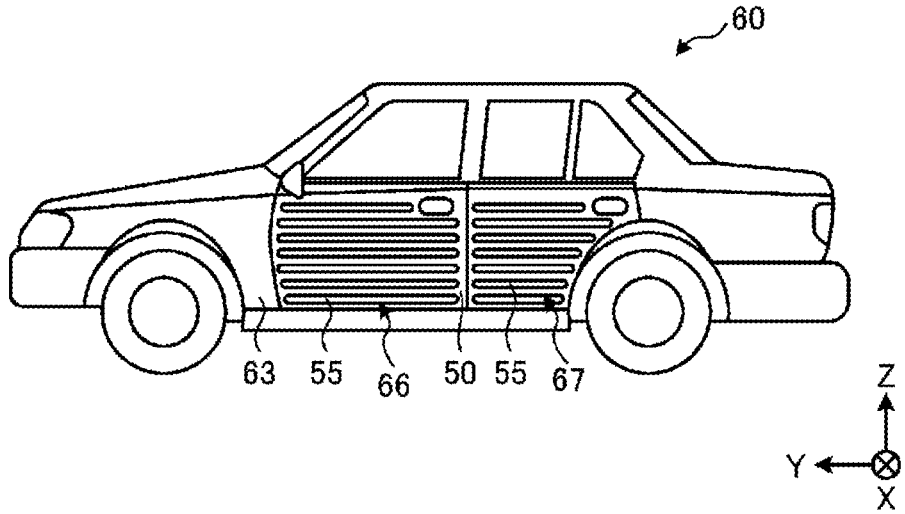
FIG. 5 is a side view illustrating an example of an automobile according to the first embodiment.

FIG. 3 is a plan view illustrating an example of an automobile according to a first embodiment. FIG. 4 is a cross-sectional view taken along line A-A in FIG. 3. FIG. 5 is a side view illustrating an example of an automobile according to the first embodiment.

The automobile 60 according to the first embodiment includes a plurality of protruding portions 55 extending along the car body 30 from the front toward the rear (from a front end 61 toward a rear end 62). The plurality of protruding portions 55 are formed, for example, along the Y axis direction on the surfaces of the coating films 50 coated on a bonnet 64, a roof 65, and side face doors 66 and 67 located on a side face 63 of the car body 30. Each protruding portions 55 have a shape extending from the front toward the rear along the car body 30. For example, on the bonnet 64 or the roof 65, a plurality of protruding portions 55 are arranged in the width direction along the car body 30, and on the side faces of the car body 30, a plurality of protruding portions 55 are arranged in the height direction along the car body 30. That is, the plurality of protruding portions 55 are arranged along the car body 30 in the width direction or the height direction.

The plurality of protruding portions 55 protrude in the thickness direction of the coating film 50 on the surface of the coating film 50, and may be formed, for example, by a difference in the thickness of the coating film 50. That is, the thickness of the coating film 50 can be made thicker in the protruding portion 55 than in the portion where the protruding portion 55 is not arranged. When the protruding portion 55 is formed by the difference in the thickness of the coating film 50, the protruding portion 55 can be easily formed at the time of coating by using, for example, an inkjet head to change the discharge amount of the coating material depending on the location. That is, a coating method can be used in which a coating material is discharged toward the to-be-coated surface of the car body 30, and a plurality of protruding portions 55 extending from the front toward the rear along the car body 30 are formed on the surface of the coating film 50. In place of the difference in thickness of the coating film 50, the difference in thickness of the base member 31 or the primer layer 32 may form the protruding portion 55 on the surface of the coating film 50, and the curvature of the base member 31 may form the protruding portion 55 on the surface of the coating film 50.

In FIG. 4, the height h of the protruding portion 55 may be, for example, 20 μm to 150 μm. An interval d between the adjacent protruding portions 55 may be, for example, 20 μm to 150 μm. Similarly, the width of the protruding portion 55 may be, for example, 20 μm to 150 μm.

Thus, the coating film 50 on the surface of the car body 30 includes a plurality of protruding portions 55 extending along the car body 30 from the front toward the rear. That is, the automobile 60 includes the plurality of protruding portions 55 extending from the front toward the rear along the car body 30 on the surface of the coating film 50. This allows the automobile 60 to have the effect of reducing frictional resistance during travel, for example, by reducing air flow rate between adjacent protruding portions 55.

The automobile 60 may also obtain the effect of reducing pressure resistance, by a plurality of protruding portions 55, for example, due to reduction of boundary layer separation by causing turbulence. The shape, the size, the arrangement, or the like of the protruding portion 55 of the car body 30 can be appropriately set in accordance with the desired effect and the degree of the frictional resistance reduction effect and the pressure resistance reduction effect. For example, in the direction from the front toward the rear of the car body 30 (the direction from the front end 61 toward the rear end 62 along the Y axis), when the plurality of protruding portions 55 are provided in a portion (for example, the portion indicated by P1 in FIG. 3) located in front (front end 61 side) of a portion (in FIG. 3, for example, near the front end of the rear glass 68) where the ratio of the decrease in the cross-sectional area (the cross-sectional area of the cross-section perpendicular to the direction from the front toward the rear of the car body 30) of the car body 30 increases, the effect of reducing the pressure resistance of the automobile 60 by reducing the boundary layer separation can be enhanced.

The dimensions such as the height h, the width, and the interval d of the protruding portion 55 described above are not limited to the numerical range described above, and may be made smaller or larger. For example, when it is desired to increase the effect of generating turbulence, it is effective to increase the height h of the protruding portion 55. The dimensions such as the height h, the width, and the interval d of the protruding portion 55 may be substantially different from each other.

Second Embodiment

Figure 6:
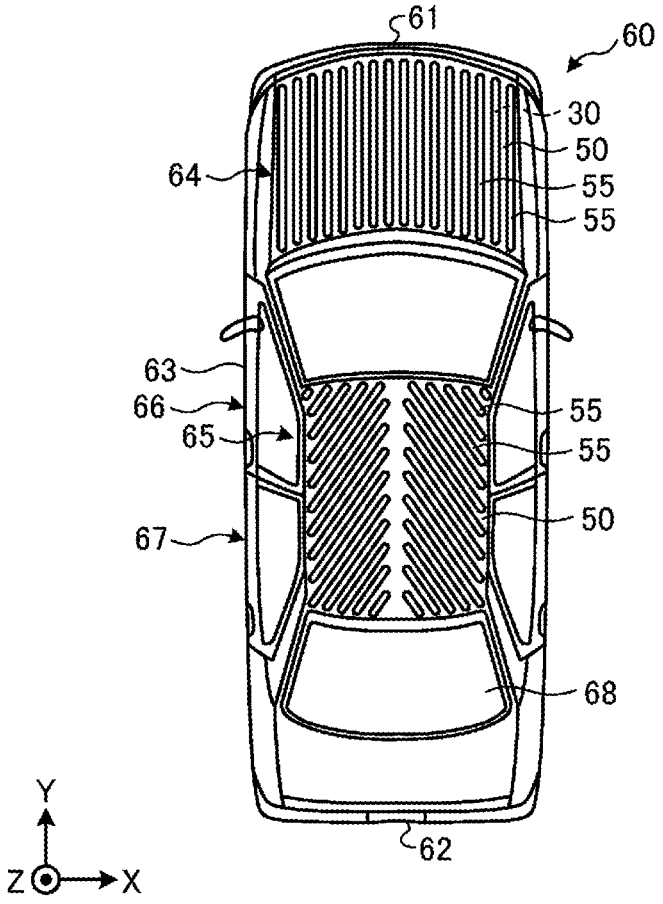
FIG. 6 is a plan view illustrating an example of an automobile according to a second embodiment.
Figure 7:
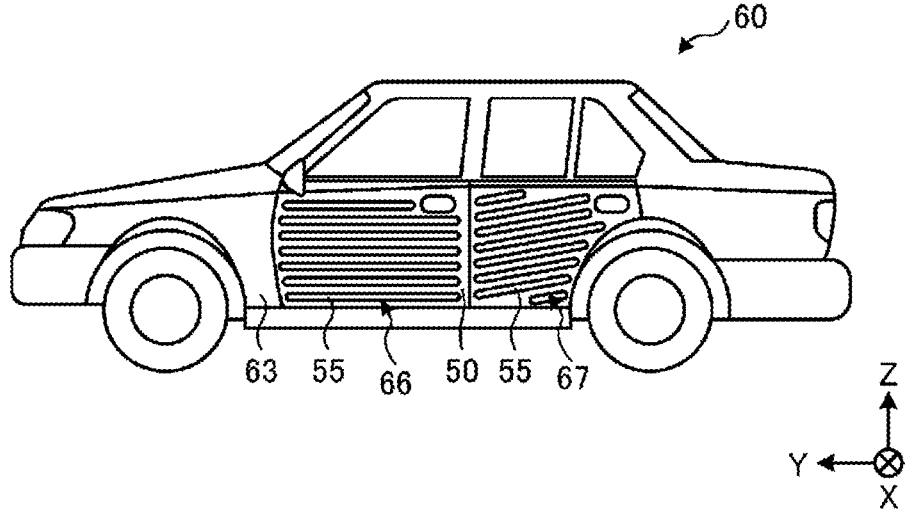
FIG. 7 is a side view illustrating an example of an automobile according to the second embodiment.

FIG. 6 is a plan view illustrating an example of an automobile according to a second embodiment. FIG. 7 is a side view illustrating an example of an automobile according to the second embodiment.

An automobile 60 according to the second embodiment includes a plurality of protruding portions 55 extending along a direction inclined with respect to a direction (the direction from a front end 61 toward a rear end 62 along the Y axis) from the front toward the rear of a car body 30 on the surface of a coating film 50 coated on a roof 65 and a rear side face door 67. The roof 65 has the plurality of protruding portions 55 extending from the front end 61 of the car body 30 toward a side face 63, and the side face door 67 has the plurality of protruding portions 55 extending obliquely upward along the side face 63 of the car from the front toward the rear of the car body 30. In this manner, the plurality of protruding portions 55 may have a configuration to include portions extending along a direction inclined with respect to a direction from the front toward the rear of the car body 30. When the automobile 60 has such a configuration, the effect of causing turbulence can be enhanced. The plurality of protruding portions 55 formed on the side face 63 of the car may be formed in a manner to extend obliquely downward from the front toward the rear of the car body 30 along the side face 63 of the car.

The automobile 60 includes, on the surface of the coating film 50 coated on the bonnet 64 and the front side face door 66, the plurality of protruding portions 55 extending from the front toward the rear of the car body 30 as in the first embodiment. This allows the automobile 60 to obtain, on the surfaces of the bonnet 64 and the front side face door 66, the effect of reducing frictional resistance. Thus, the plurality of protruding portions 55 extending in a direction from the front toward the rear of the car body 30 can be arranged on the front end 61 side of the car body 30, and the plurality of protruding portions 55 including portions extending along a direction inclined with respect to a direction from the front toward the rear of the car body 30 can be arranged on the rear end 62 side of the car body 30. In the case where the automobile 60 has such a configuration, it is possible to obtain the effect of reducing the frictional resistance on the front end 61 side of the car body 30, and also to obtain the effect of reducing the boundary layer separation occurring rearward of the car body 30 by facilitating the occurrence of turbulence on the rear end 62 side of the car body 30.

Further, the automobile 60 may also include, on the surface of the coating film 50 coated on the bonnet 64 and the front side face door 66, the plurality of protruding portions 55 including portions extending along a direction inclined with respect to the direction from the front toward the rear of the car body 30. When the automobile 60 has such a configuration, the effect of facilitating the occurrence of turbulence can be enhanced.

Modification of Second Embodiment

Figure 8:
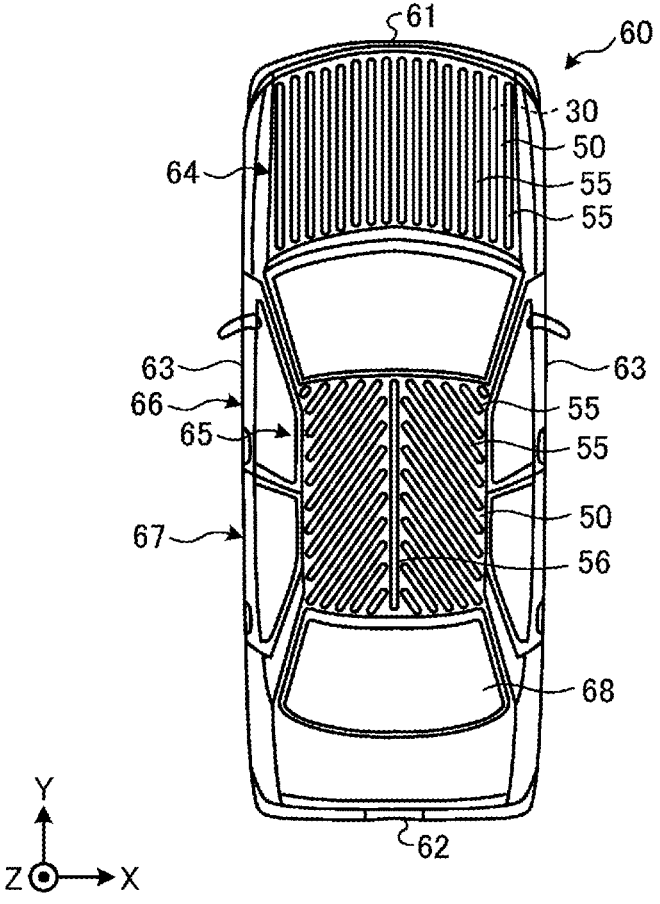
FIG. 8 is a plan view illustrating an example of an automobile according to a modification of the second embodiment.

FIG. 8 is a plan view illustrating an example of an automobile according to a modification of the second embodiment. An automobile 60 illustrated in FIG. 8 differs from the automobile 60 according to the second embodiment illustrated in FIG. 6 in that the roof 65 further includes a protruding portion 56 extending from the front toward the rear (from the front end 61 toward the rear end 62) of the car body 30 along the Y axis direction. Thus, when the automobile 60 includes a plurality of protruding portions 55 and 56 extending in different directions, the effect of facilitating the occurrence of turbulence can be enhanced.

Third Embodiment

Figure 9:
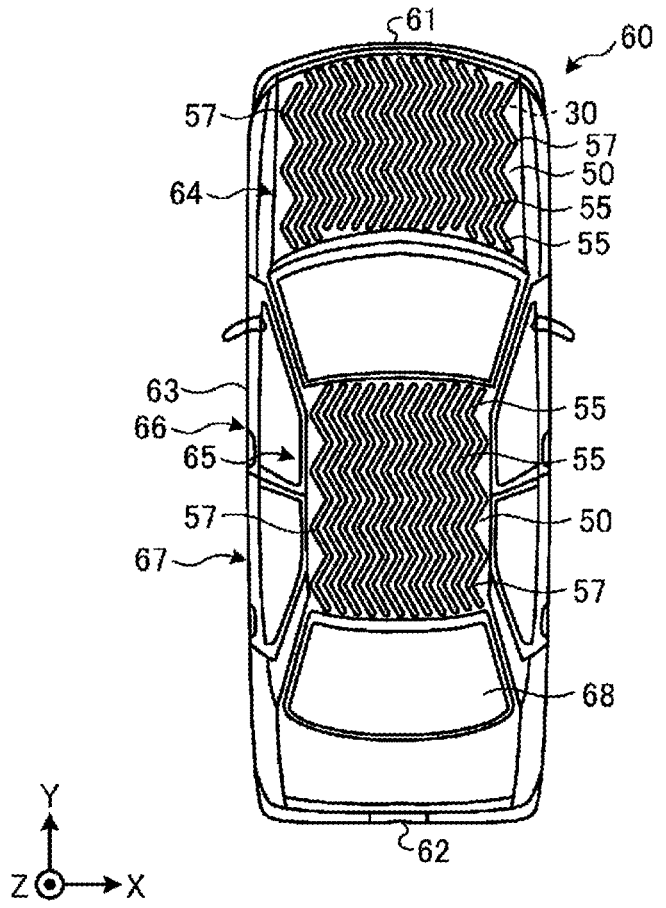
FIG. 9 is a plan view illustrating an example of an automobile according to a third embodiment.

FIG. 9 is a plan view illustrating an example of an automobile according to a third embodiment. An automobile 60 according to the third embodiment includes a plurality of protruding portions 55 extending along a direction inclined with respect to a direction from the front toward the rear of a car body 30 in a manner to be folded back across a plurality of bent portions 57. That is, each of the plurality of protruding portions 55 includes the plurality of bent portions 57 and extends as a whole in a direction from the front toward the rear of the car body 30 while changing the direction to extend at the plurality of bent portions 57. When the automobile 60 includes such a protruding portion 55, the effect of facilitating the occurrence of turbulence can be enhanced.

Fourth Embodiment

Figure 10:
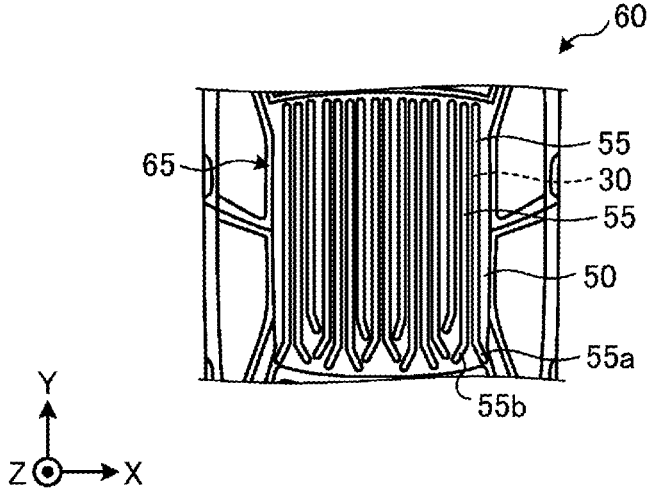
FIG. 10 is a plan view illustrating an example of an automobile according to a fourth embodiment.

FIG. 10 is a plan view illustrating an example of an automobile according to a fourth embodiment. In an automobile 60 according to the fourth embodiment, a plurality of protruding portions 55 extend from the front toward the rear on the front side (for example, the front end 61 side illustrated in FIG. 3) of a car body 30, and are bent at end portions 55a and 55b on the rear side (for example, the rear end 62 side illustrated in FIG. 3) of the car body 30. In the case where the automobile 60 has such a configuration, it is possible to obtain the effect of reducing the frictional resistance in the portion where the plurality of protruding portions 55 extend from the front toward the rear, and to obtain the effect of facilitating the occurrence of turbulence in the portion where the plurality of protruding portions 55 are bent. In particular, when the directions of the end portions 55a and 55b of the protruding portions 55 are different from each other as illustrated in the drawing, the effect of facilitating the occurrence of turbulence can be enhanced. Although FIG. 10 illustrates only the plurality of protruding portions 55 formed on the roof 65, the end portions on the rear side of the car body 30 may be bent in the same manner as the end portions 55a and 55b, for example, for the plurality of protruding portions 55 formed on the bonnet 64 illustrated in FIG. 3, or the side face doors 66 and 67 illustrated in FIG. 5.

First and Second Modifications

Figure 11A:
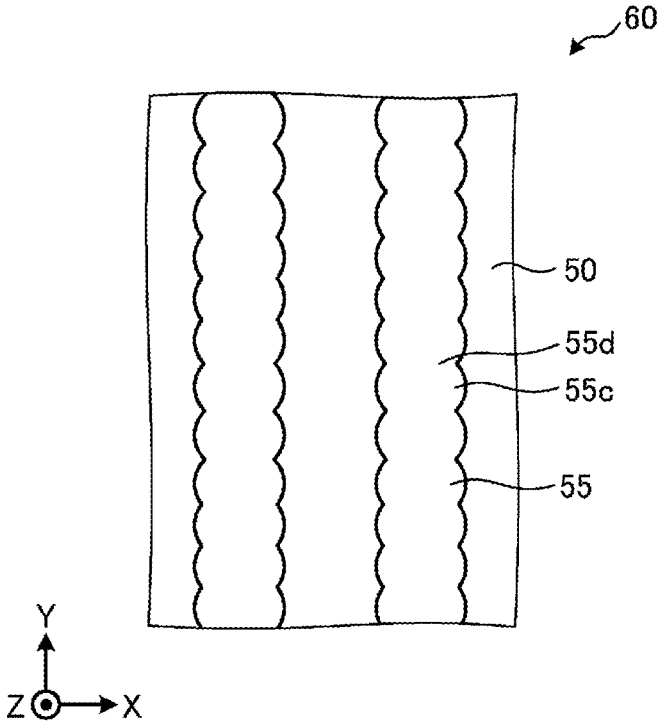
FIG. 11A is a plan view illustrating an example of an automobile according to a first modification.
Figure 11B:
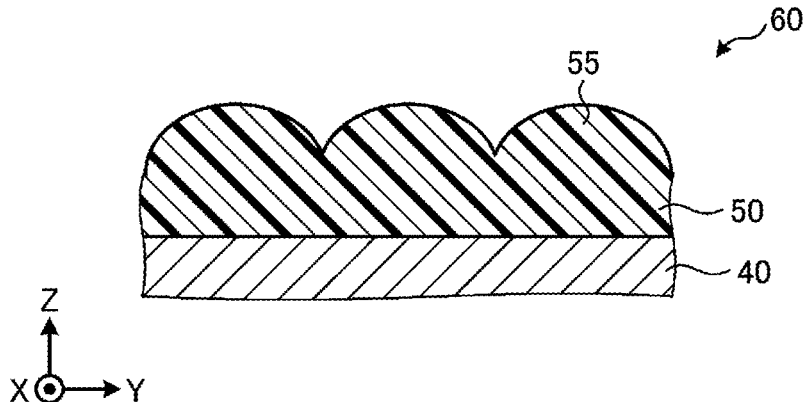
FIG. 11B is a cross-sectional view illustrating an example of an automobile according to a second modification.

In each of the above embodiments, an example of the protruding portion 55 whose shape does not change in the length direction has been illustrated, but the embodiments are not limited to the example. FIGS. 11A and 11B are plan views illustrating examples of automobiles according to the first and second modifications, respectively.

A protruding portion 55 illustrated in FIG. 11A includes a first portion 55c and a second portion 55d having different sizes in the width direction (X axis direction) intersecting the length direction (Y axis direction) of the protruding portion 55. On the other hand, a protruding portion 55 illustrated in FIG. 11B includes portions having a different size in the height direction (Z axis direction) intersecting the length direction (Y axis direction) of the protruding portion 55. In this manner, each protruding portion 55 may vary in shape in the length direction. When the automobile 60 has such a configuration, the effect of facilitating the occurrence of turbulence can be enhanced. Although FIGS. 11A and 11B illustrate an example of the plurality of protruding portions 55 formed on the roof 65 or the bonnet 64, the plurality of protruding portions 55 formed on side face doors 66 and 67 may similarly have different sizes in the width direction (Z axis direction) or the height direction (X axis direction) intersecting the length direction of the protruding portion 55.

Third to Fifth Modifications

Figure 12A:
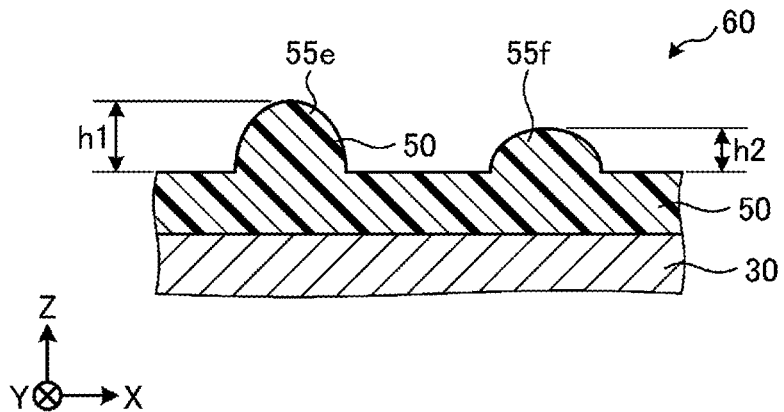
FIG. 12A is a cross-sectional view illustrating an example of an automobile according to a third modification.
Figure 12B:
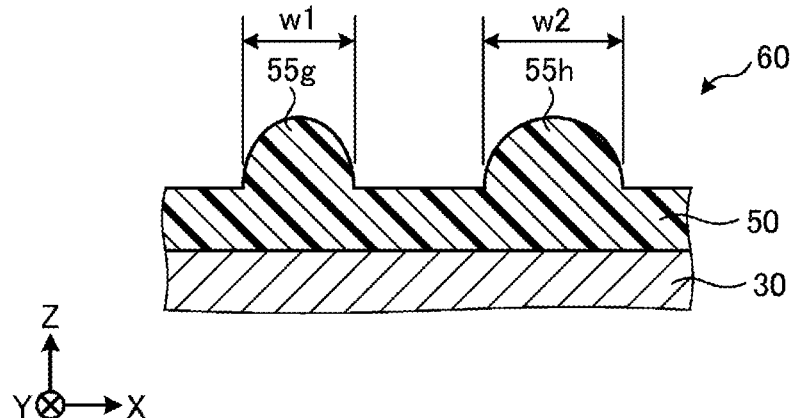
FIG. 12B is a cross-sectional view illustrating an example of an automobile according to a fourth modification.
Figure 12C:
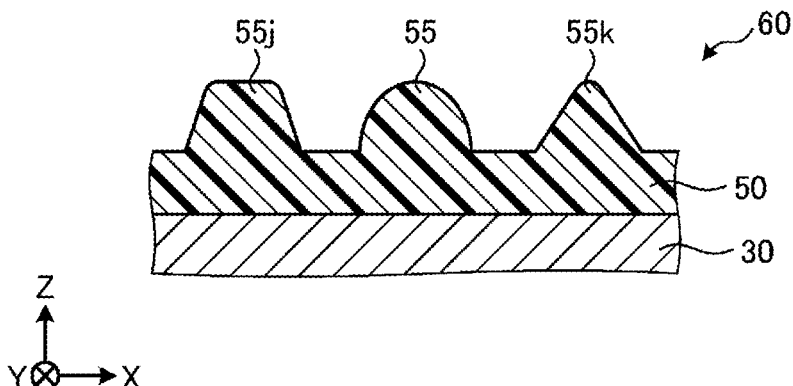
FIG. 12C is a cross-sectional view illustrating an example of an automobile according to a fifth modification.

In each of the embodiments described above, the plurality of protruding portions 55 are illustrated as having substantially the same shape, but the embodiments are not limited to such a configuration. FIGS. 12A to 12C are cross-sectional views illustrating examples of automobiles according to the third to fifth modifications, respectively.

An automobile 60 illustrated in FIG. 12A includes a protruding portion 55e having a height direction (Z axis direction) size of h1 and a protruding portion 55f having a height direction (Z axis direction) size of h2 (where h1>h2). An automobile 60 illustrated in FIG. 12B includes a protruding portion 55g having a width direction (X axis direction) size of w1 and a protruding portion 55h having a width direction (X axis direction) size of w2 (where w1<w2). Further, an automobile 60 illustrated in FIG. 12C includes a protruding portion 55 having a substantially arc-shaped cross-section, a protruding portion 55j having a substantially quadrilateral cross-section, and a substantially triangle protruding portion 55k. Thus, the plurality of protruding portions 55 may be different in shape from each other. When the automobile 60 has such a configuration, the effect of facilitating the occurrence of turbulence can be enhanced.

Sixth Modification

Figure 13:
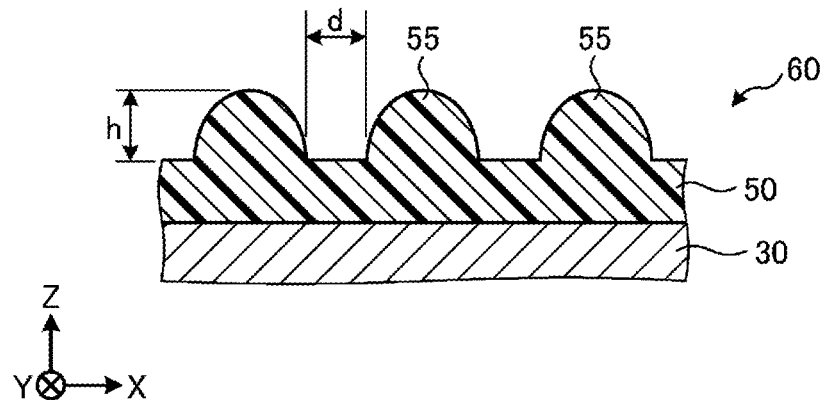
FIG. 13 is a cross-sectional view illustrating an example of an automobile according to a sixth modification.

FIG. 13 is a cross-sectional view illustrating an example of an automobile according to a sixth modification. As illustrated in FIG. 13, a plurality of protruding portions 55 may have an interval d between adjacent protruding portions 55 smaller than the height h of the protruding portion. When the automobile 60 has such a configuration, the effect of reducing frictional resistance between adjacent protruding portions 55 can be enhanced.

Although the embodiments of the present invention have been described above, the present invention is not limited to the embodiments described above, and various modifications are possible without departing from the spirit thereof. For example, although each of the embodiments described above has been described as including the plurality of protruding portions 55 having similar shapes on the bonnet 64, the roof 65, and the side face doors 66 and 67, for example, two or more of the embodiments and modifications may be suitably combined in the bonnet 64, the roof 65, and the side face doors 66 and 67.

Although the car body 30 is illustrated as a flat surface in each of the above embodiments, the embodiments are not limited to such a configuration, and the car body 30 may be a curved surface or may be inclined.

Further effects and modifications can be readily derived by those skilled in the art. Thus, a wide variety of aspects of the present invention are not limited to the specific details and representative embodiments represented and described above. Accordingly, various changes are possible without departing from the spirit or scope of the general inventive concepts defined by the appended claims and their equivalents.

The invention claimed is:

1. A vehicle, comprising:
a car body; and
a coating film on a surface of the car body of the vehicle,
the coating film comprising a plurality of protruding portions, wherein
the plurality of protruding portions includes:
a plurality of first protruding portions extending in a first direction, and
a plurality of second protruding portions extending in a second direction different from the first direction,
the plurality of first protruding portions is located on a roof of the car body, and
the plurality of second protruding portions is located on a bonnet of the car body.

2. The vehicle according to claim 1, wherein
the coating film further comprises a base film,
the plurality of protruding portions is directly on parts, rather than on an entirety, of the base film, and an entirety of coating components of the base film is the same as that of the plurality of protruding portions.

\* \* \* \* \*